United States Patent Office 3,541,026
Patented Nov. 17, 1970

3,541,026
PEROXIDIC CATALYSTS FOR POLYMERIZATION OF ETHYLENICALLY UNSATURATED COMPOUNDS
Bodo Schaaf, Munich, and Heinz Winter, Pullach, near Munich, Germany, assignors to Elektrochemische Werke Munchen A.G., Hollriegelskreuth, near Munich, Germany
No Drawing. Filed Aug. 1, 1967, Ser. No. 657,489
Claims priority, application Germany, Aug. 2, 1966,
E 32,194
Int. Cl. C08f 29/04, 29/18, 29/40
U.S. Cl. 252—426        13 Claims

ABSTRACT OF THE DISCLOSURE

Acety cyclohexyl sulphonyl peroxide, unstable as such, is used as a non-explosive and not shock sensitive catalytic composition for the polymerization of ethylenically unsaturated compounds, in mixture with water and with lauroyl peroxide or a solid ethylenic polymerization product or a mixture thereof.

---

This invention relates to peroxidic compounds and, particularly to peroxidic polymerization catalysts.

Acetyl cyclohexyl sulphonyl peroxide is a particularly suitable catalyst in the polymerization of ethylenically unsaturated compounds and, particularly, of vinyl compounds. In the pure state acetyl cyclohexyl sulphonyl peroxide is extremely unstable. It may be partially stabilized by the presence of water but even when the maximum quantity of 25% to 35% w./w. of water by weight of the peroxide is adsorbed thereon spontaneous decomposition of the peroxide may still occur.

It has now been found that acetyl cyclohexyl sulphonyl peroxide containing adsorbed water may be fully stabilized by the addition thereto of certain substances which are either themselves catalysts in the polymerization of ethylenically unsaturated compounds or are, themselves, ethylenic polymerisates. The invention thus enables stable acetyl cyclohexyl sulphonyl peroxide compositions to be produced which contain only substances fully compatible with those involved in the use of such compositions.

The invention therefore provides a solid composition, for use in the polymerization of ethylenically unsaturated compounds, comprising a mixture of acetyl cyclohexyl sulphonyl peroxide and at least 33%, by weight of the acetyl cyclohexyl sulphonyl peroxide, of lauroyl peroxide, the mixture having adsorbed thereon a stabilizing quantity of water.

Lauroyl peroxide is itself a useful catalyst for the polymerization of ethylenically unsaturated compounds and it is most surprising that it has a stabilizing effect on acetyl cyclohexyl sulphonyl peroxide. A quantity of water equal to from 20% to 40% of the composition is a suitable stabilizing quantity. However, if a large proportion of lauroyl peroxide is present, a lesser proportion of water may suffice to stabilize the composition. It may, however, readily be determined whether a stabilizing quantity of water is being used and whether, therefore, the composition is within the invention, by subjecting particular compositions to known tests of explosiveness and of stability of active oxygen containing substances in storage. Preferably the composition contains at least 33% w./w of absorbed water.

The quantity of lauroyl peroxide must, critically, be at least 33% by weight of the acetyl cyclohexyl sulphonyl peroxide and any quantity from 33% to 300% w./w. is suitable. Preferably, however, compositions according to this invention contain from 33% to 100% w./w. of lauroyl peroxide based on the quantity of acetyl cyclohexyl sulphonyl peroxide present.

The present invention also provides a modification of the lauroyl peroxide containing composition disclosed wherein the lauroyl peroxide is replaced, either in part or in whole, by one or more of certain ethylenic polymerizates. The invention, therefore, provides a composition for use in the polymerization of ethylenically unsaturated compounds, comprising a mixture of acetyl cyclohexyl sulphonyl peroxide and at least 15% by weight thereof of a water insoluble, normally solid ethylenic polymerizate, the mixture having adsorbed therein a stabilizing quantity of water. Preferably, in such a composition the polymerizate is the same as that produced by the reaction which it is intended that the composition should catalyze. For example, where vinyl chloride is to be polymerized, an acetyl cyclohexyl sulphonyl peroxide-containing composition stabilized with polyvinyl chloride is an advantageous polymerization catalyst. Preferably no more than 75% of polymerizate, by weight of the acetyl cyclohexyl sulphonyl peroxide, is used. Besides polyvinyl chloride, polyvinyl acetate and polyethylene are advantageous polymerizates to use.

Where acetyl cyclohexyl sulphonyl peroxide containing compositions are stabilized by means of a mixture of a suitable polymerizate and lauroyl peroxide, the minimum total quantity of stabilizing substance which must be used is between 15% w./w. and 33% w./w. by weight of the acetyl cyclohexyl sulphonyl peroxide, depending on the proportions of polymerizate and lauroyl peroxide used. This invention therefore also provides a composition for use in the polymerization of ethylenically unsaturated compounds, comprising a mixture of acetyl cyclohexyl sulphonyl peroxide and both lauroyl peroxide in a quantity less than 33% by weight thereof and a water insoluble normally solid ethylenic polymerizate in less than 15% by weight thereof, the mixture having adsorbed thereon at least 20%, preferably 25%, by weight of water and the lauroyl peroxide together with the polymerizate being present, in total, in a stabilizing quantity. Where a polymerizate only is used in accordance with the present invention, a suitable stabilizing quantity of water is at least 25% by weight of the composition although, as in the case of lauroyl peroxide, a lesser quantity of water may achieve stabilization if a larger proportion of polymerizate is used and this lesser quantity is readily established by known testing means. Normally however about 30% of water by weight of the composition is preferred in any embodiment of the invention.

Preferably the compositions according to this invention comprise homogeneous mixtures containing adsorbed water.

The compositions are manufactured by firstly melting acetyl cyclohexyl sulphonyl peroxide in excess water, incorporating the stabilizing substance into the melt, maintaining the mixture of acetyl cyclohexyl sulphonyl peroxide and stabilizing substance in agitation, allowing the mixture to cool so as to solidify the acetyl cyclohexyl sulphonyl peroxide, and separating the resulting solid mixture from residual water. The solid mixture will have the form of a granulate.

Since the mixtures of this invention are preferably homogeneous, it is advantageous where the stabilizing substance has a low enough melting point, to incorporate it into the molten acetyl cyclohexyl sulphonyl peroxide as a melt. Lauroyl peroxide melts at from about 55° C. to 65° C. and it is therefore preferably incorporated as a melt. Most suitable polymerizates will have higher melting temperatures than this and so are normally incorporated in solid finely divided form. If it is desired to incorporate lauroyl peroxide into the mixture as a solid, this is also in finely divided form.

The acetyl cyclohexyl sulphonyl peroxide used has, preferably, already got a content of some 25% to 35% of adsorbed water.

The present invention also provides a process for the polymerization of ethylenically unsaturated compounds and, particularly, of polyethylene or polyvinyl chloride which uses, as catalyst, a composition according to the present invention and also provides ethylenic polymerizates produced from such a process and articles of manufacture produced from such polymerizates.

The invention will now be illustrated, in some embodiments, by means of the following examples. Examples relating to compositions no stabilized by means of either lauroyl peroxide or a suitable polymerizates are included for comparative purposes only. In the examples, the symbol LP is intended to indicate lauroyl peroxide, and the symbol ACSP is intended to indicate acetyl cyclohexyl sulphonyl peroxide.

EXAMPLE 1

298 g. of 67% ACSP were melted in water at a temperature of between 32° C. and 35° C. while stirring. To this was added a melt of 200 g. of LP having a temperature of about 55° C. to 65° C., and the two melts were thoroughly stirred for about ½ min. The temperature of the mixture was between 45° and 50° C. The mixture was then granulated in a large quantity of cold water and separated through a sieve. The proportion of water contained in the final product was 31.4%.

EXAMPLE 2

This was carried out in the same manner as Example 1, except that 250 g. of LP in powder form were added to the ACSP. The temperature of the mixture in this case was between 32° C. and 35° C. Granulation and separation was carried out as already described.

The product obtained was a granulate which was free-flowing and safe to handle. The water content of the final product was 34.8%.

EXAMPLES 3-9

Compositions having the contents of ACSP, LP and water indicated in the table below were prepared in the same manner as that set out in Example 1. The stability of the resulting compositions were tested by heating in a steel bomb with a defined opening and also with regard to shock sensitivity by the methods disclosed in the Journal "Arbeitsschutz" No. 9, pages 204–205 (1959) and No. 3, pages 53–58 (1961). The results were as set out in the following table.

| Ex. No. | Components of the mixture Steel by weight, parts | | | Steel bomb test | Shock sensitivity test |
|---|---|---|---|---|---|
| | ACSP | LP | Water | | |
| 3 | 1.6 | 0.4 | 1 | Explosive | Shock sensitive. |
| 4 | 1.5 | 0.5 | 1 | Non-explosive | Not shock sensitive. |
| 5 | 1 | 1 | 1 | do | Do. |
| 6 | 0.5 | 1.5 | 1 | do | Do. |
| 7 | 1 | 1 | 0 | Explosive | Shock sensitive. |
| 8 | 3 | 1 | 0 | do | Do. |
| 9 | 1 | 5 | 0 | Non-explosive | Not shock sensitive. |

EXAMPLES 10-13

470 g. of damp acetyl cyclohexane sulphonyl peroxide (approx. 69%) were melted in hot water at 35° C. in a 2 litre special steel vessel with concomitant stirring. 25 g. of polyvinyl chloride powder (Vinnol H 100/70) were then added and vigorous stirring was applied briefly. The mixture was then cooled, by means of a water bath, to an internal temperature of 11–12° C. with concomitant vigorous stirring. This resulted in granulated of peroxide-PVC mixture and the granulate was drawn off. It had the following composition:

|  | Percent |
|---|---|
| Acetyl cyclohexyl sulphonyl peroxide | 65 |
| Water | 30 |
| PVC powder | 5 |

Peroxide-PVC mixtures containing 10% and 30% respectively of PVC were prepared by an analogous process.

The degree of explosion hazard was investigated by the steel bomb test.

| Example No. | Percent w./w. content of— | | | Explosion hazard |
|---|---|---|---|---|
| | ACSP | H₂O | PVC | |
| 10 | 70 | 30 | 0 | Explosion hazard. |
| 11 | 65 | 30 | 5 | Do. |
| 12 | 60 | 30 | 10 | No explosion hazard. |
| 13 | 40 | 30 | 30 | Not explosive. |

We claim:
1. A solid composition suitable for use in the polymerization of ethylenically unsaturated compounds comprising a mixture of acetyl cyclohexyl sulphonyl peroxide and a member selected from the group consisting of 33% to 300% by weight based on the acetyl cyclohexyl sulphonyl peroxide of lauroyl peroxide and 15% to 75% by weight based on the acetyl cyclohexyl sulphonyl peroxide of an ethylenic polymerizate selected from the group consisting of polyvinyl chloride polyvinyl acetate and polyethylene said mixture having absorbed thereon a stabilizing quantity of water.

2. A composition as claimed in claim 1 comprising a mixture of acetyl cyclohexyl sulphonyl peroxide and lauroyl peroxide.

3. A composition as claimed in claim 2 which contains from 20% to 40% by weight of adsorbed water.

4. A process for preparing a composition as claimed in claim 1 comprising mixing molten acetyl cyclohexyl sulphonyl peroxide and lauroyl peroxide together in excess water, maintaining the mixture in agitation, allowing the mixture to solidify, and separating the mixture from residual water.

5. A process as claimed in claim 4 wherein the acetyl cyclohexyl sulphonyl peroxide is melted "in situ" in the excess water and a member of the group consisting of powdered lauroyl peroxide and already molten lauroyl peroxide is then introduced into the water.

6. A process as claimed in claim 4 wherein at least the acetyl cyclohexyl sulphonyl peroxide already has a content of from 25% to 35% adsorbed water before it is introduced into the excess water.

7. A composition as claimed in claim 1 comprising a mixture of acetyl cyclohexyl sulphonyl peroxide and an ethylenic polymerizate selected from the group consisting of polyvinyl chloride, polyvinyl acetate and polyethylene.

8. A composition as claimed in claim 7 containing at least 30% of adsorbed water.

9. A process for preparing a composition as claimed in claim 7 comprising mixing molten acetyl cyclohexyl sulphonyl proxide together with a solid powdered water-insoluble ethylenic polymerizate in excess water, maintaining the mixture in agitation, allowing the peroxide to solidify and separating the mixture from residual water.

10. A process as claimed in claim 7 wherein the polymerizate consists of at least one member of the group consisting of polyethylene, polyvinyl chloride and polyvinyl acetate.

11. A process as claimed in claim 7 wherein the acetyl cyclohexyl sulphonyl peroxide is melted "in situ" in the excess water and the polymerizate is then introduced into the water.

12. A process as claimed in claim 7 wherein the acetyl cyclohexyl sulphonyl peroxide to be used already has a content of adsorbed water.

13. A composition suitable for the catalytic polymerization of ethylenically unsaturated compounds comprising a mixture of acetyl cyclohexyl sulphonyl peroxide, less than 33% lauroyl peroxide and less than 15% of ethylenic polymerizate selected from the group consisting of polyvinyl chloride, polyvinyl acetate, and polyvinyl ethylene, both percentages being by weight of said acetyl cyclohexyl sulphonyl peroxide, the lauroyl peroxide together with the ethylenic polymerizate being present, in total, in a stabilizing quantity and in a minimum amount of from 15% to 33% by weight of said acetyl cyclohexyl sulphonyl peroxide, the mixture having adsorbed thereon a stabilizing quantity of at least 20% by weight of water.

References Cited

UNITED STATES PATENTS

| | | | |
|---|---|---|---|
| 2,975,162 | 3/1961 | Iloff | 260—85.7 |
| 3,228,919 | 1/1966 | Gatta et al. | 260—85.5 |
| 3,328,371 | 6/1967 | Beer | 260—92.8 |
| 3,340,243 | 9/1967 | Beer et al. | 260—92.8 |

JOSEPH L. SCHOFER, Primary Examiner

C. A. HENDERSON, JR., Assistant Examiner

U.S. Cl. X.R.

252—186; 260—80, 89.1, 92.8, 94.9